Nov. 6, 1945.  J. LUND  2,388,425
TRANSMISSION UNIT TESTING MACHINE
Filed Jan. 10, 1944  5 Sheets-Sheet 1

INVENTOR.
JOHAN LUND
BY
Whittemore Hulbert & Belknap
ATTORNEYS

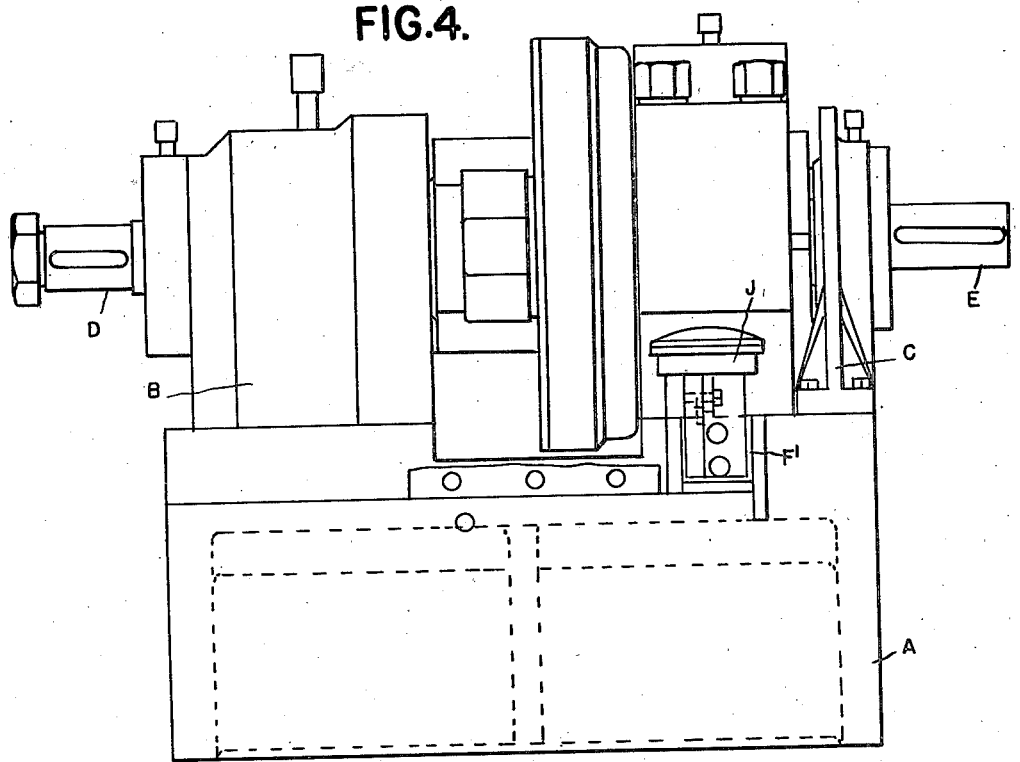
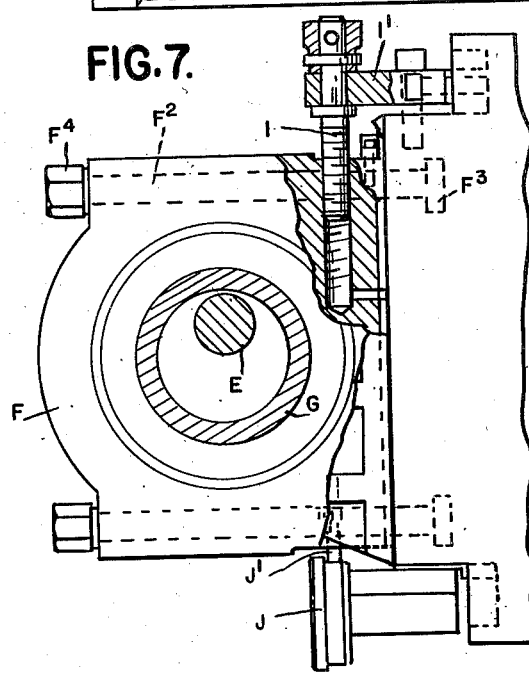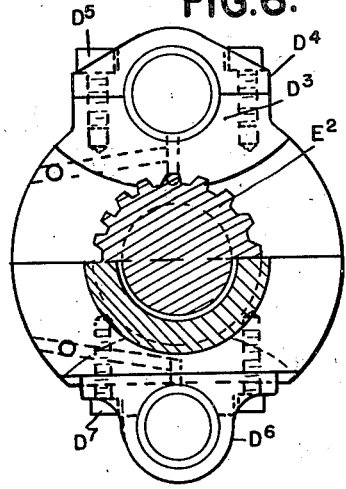

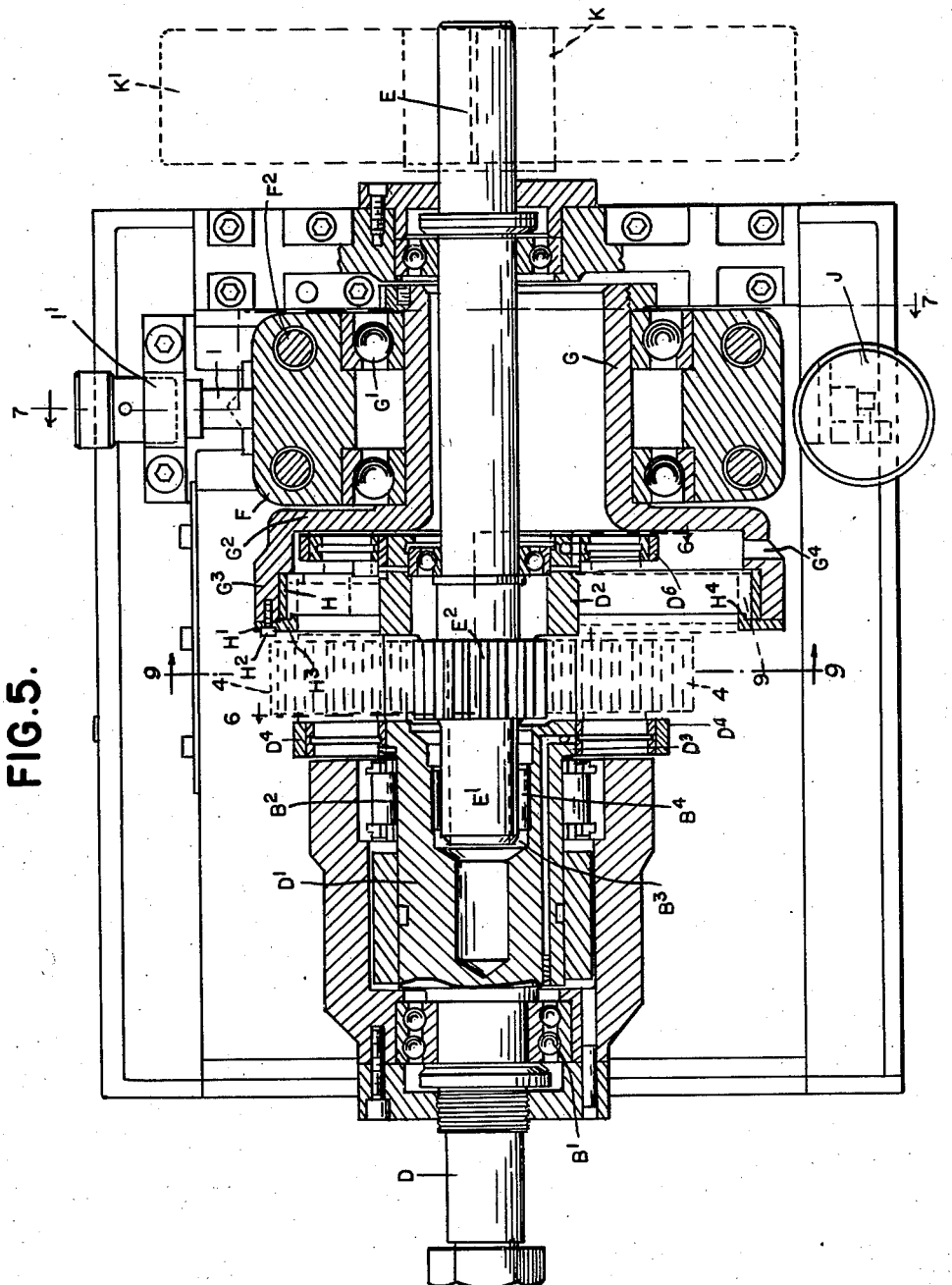

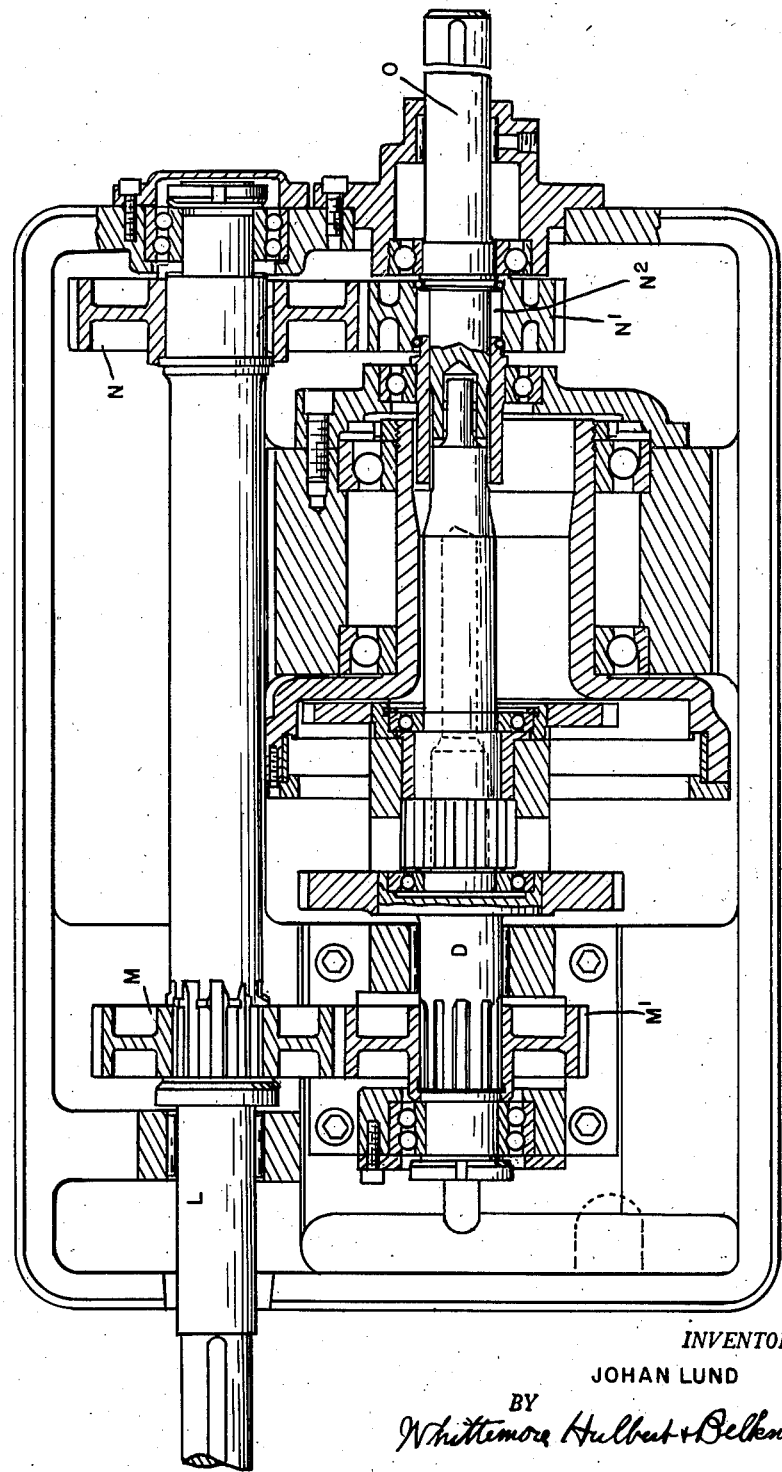

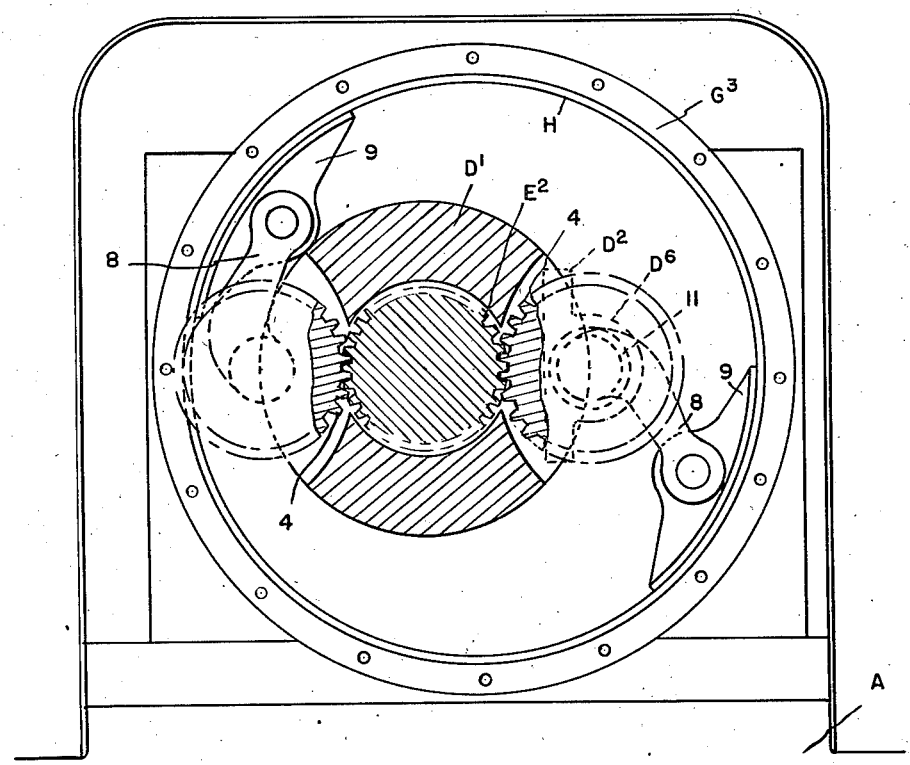

Patented Nov. 6, 1945

2,388,425

UNITED STATES PATENT OFFICE 2,388,425

TRANSMISSION UNIT TESTING MACHINE

Johan Lund, Detroit, Mich., assignor to The Gear Grinding Machine Company, Hamtramck, Mich., a corporation of Michigan Application January 10, 1944, Serial No. 517,723

6 Claims. (Cl. 73—432)

The invention relates to testing machines and more particularly to a machine designed for testing certain parts of an operating mechanism.

It is the primary object of the invention to provide testing means operating under conditions which are the same or similar to those prevailing when the mechanism is in actual use. To this end the invention consists in the construction as hereinafter set forth.

In the drawings:

Fig. 4 is a front elevation of the testing mechanism;

Fig. 5 is a horizontal section therethrough;

Fig. 6 is a sectional elevation on line 6—6, Fig. 5;

Fig. 7 is a sectional elevation on line 7—7, Fig. 5; and

Fig. 8 is a section similar to Fig. 5 showing a modified construction.

Fig. 9 is a cross section substantially on line 9—9, Fig. 5.

Variable speed rotary transmission mechanism

Figure 1:
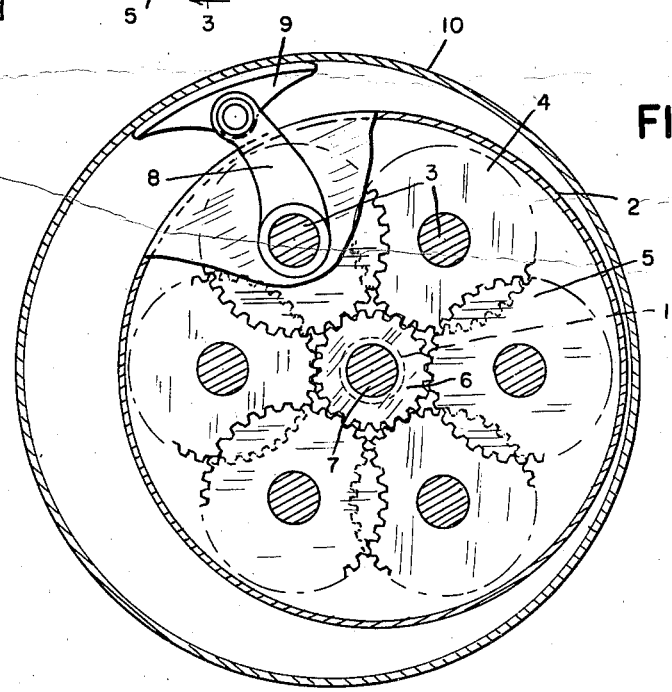
Fig. 1 is a diagrammatic sectional elevation of a power transmission mechanism containing sub-mechanisms to be tested.

The mechanism diagrammatically illustrated in Fig. 1 is a variable speed rotary power transmission in which I is the drive shaft. 2 is the housing mounted on the shaft and containing a circular series of rock shafts 3, each having mounted thereon a planetary gear wheel 4 through the medium of a one-way clutch 5. The planetary gears 4 are all in mesh with the common sun gear 6 which, in turn, is mounted on a driven shaft 7 in axial alignment with the drive shaft I. Each of the shafts 3 is also provided with a rock arm 8 having pivotally connected to its outer end a shoe 9 for engaging an annular track 10. The track 10 is rotatably mounted in a carrier (not shown) which carrier is laterally adjustable from a position where the track is concentric with the axis of the shafts I and 7 to a position eccentric to said axis. As illustrated, the track is in an eccentric position so that during the rotation of the shaft I and the housing 2 the shoes 9 will be carried around the track and due to its eccentricity will rock the shafts 3. Each of these through the medium of the one-way clutch 5 will transmit its rotation in one direction to the gear wheel 4, while during the opposite rotation the clutch will release said pinion. Also, the velocity of the rocking movement of the arms 8 will be greatest during travel of the shoe 9 through one segment of the track 10 and during this time will positively drive its corresponding pinion through the medium of the one-way clutch. This will drive the sun gear 6 and, as all the other pinions are in mesh with this gear, they will rotate at the same velocity which being greater than the velocity of their corresponding rock shafts will release the clutches 5. If the track 10 were in concentric relation with the axis of the shafts I and 7, then there would be no rocking movement imparted to the arms 8 and shafts 3 under which condition the shafts 7 will revolve at the same rate as the shaft I. Thus, it will be apparent that the increase in velocity of the driven shaft 7 over that of the drive shaft I will be proportional to the degree of eccentricity of the track 10.

Elements to be tested

Figure 2:
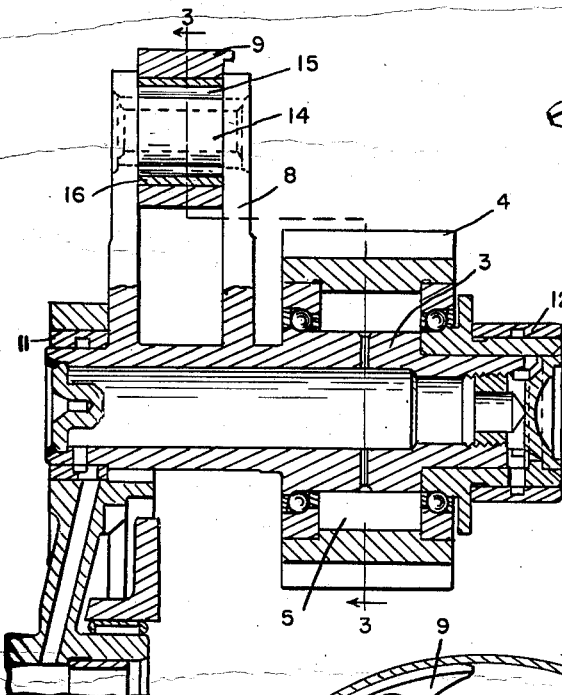
Fig. 2 is a longitudinal section through the sub-mechanism.
Figure 3:
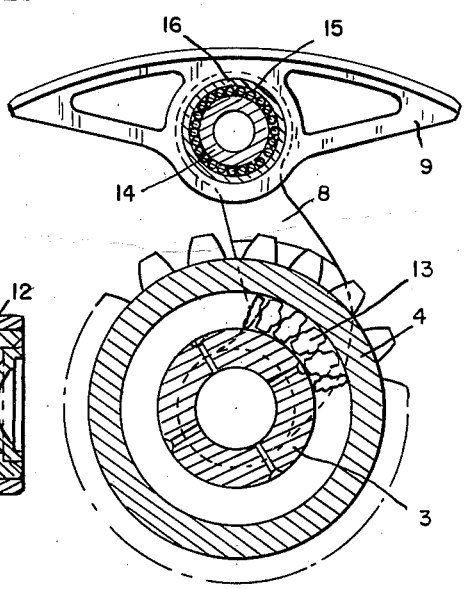
Fig. 3 is a section on line 3—3, Fig. 2.

The transmission mechanism above described is designed to operate at relatively high speeds and to transmit power from the shaft I to the shaft 7. It is, therefore, essential to determine whether all the elements of the mechanism will properly function under such conditions and also as to whether they will stand the stresses to which they are subjected without excessive wear and with a reasonable length of life. The vital parts of the mechanism are, first, the one-way clutch; second, the bearings and particularly those for the rock shafts; third, the shoe; fourth, the track. Figs. 2 and 3 show a subassembly including the rock shaft 3 together with its rock arm 8, the shoe 9 pivotally connected to said rock arm, the gear wheel 4 and the one-way clutch 5 intermediate said gear wheel and the shaft 3. Also, bushings 11 and 12 which form the bearings for the rock shaft. This entire assembly may be placed in the testing machine which will now be described.

Testing machine

A is a bed, B and C are spaced members mounted on the bed, and D and E are drive and driven shafts journaled in and extending between the members B and C and having a stepped engagement with each other. The shaft D has a portion projecting beyond the member B which is adapted to be connected with any suitable source of rotary driving power. The shaft is journaled in antifriction ball and roller bearings B' and B², the latter engaging an enlarged portion D' of the shaft D which is centrally recessed at B³ to receive the end of the shaft E. A roller bearing B⁴ is arranged in the recess to receive the end portion E' of the shaft E. There is also a gear wheel E² preferably integral with the shaft E and adjacent to the portion E'. D² is a cylindrical flange extending from the inner end of the portion D' and which has at its outer end half bearings D³ on diametrically opposite sides thereof with complementary detachable caps D⁴ secured by bolts D⁵. At the inner end of the cylindrical flange D² are full bearings D⁶ detachably secured by bolts D⁷ and respectively arranged in axial alignment with the bearings D³. Intermediate the members B and C and adjacent to the latter is a member F which is transversely slidable in a key F' in the bed A. This member F is hollow for the passage therethrough of the shaft E and also for an annular member G surrounding and spaced from said shaft. The member G is mounted in ball bearings G' in the member F so as to be freely revoluble therein. G² is a radial flange at the inner end of the member G extending adjacent to the member F and having at its outer end an annular cylindrical flange G³. H is a track member corresponding to the track 10 of the transmission mechanism fitting inside of the cylindrical flange G² and detachably secured thereto by a radial flange H' and bolts H². It is also provided with an inwardly extending radial flange H³ terminating in a cylindrical flange H⁴. The member F is laterally adjusted in the key F' by a screw I which is swiveled in a bracket I' at the side of the bed A and engages a threaded socket in said member F. By means of this adjustment the member F may be adjusted from a position where the track H is concentric with the axis of the shaft E to a position eccentric to said axis. Clamping bolts F² extend vertically through apertures in the member F at opposite sides thereof, said bolts having heads F³ at their lower ends engaging shoulders in the bed and nuts F⁴ at their upper ends. The arrangement is such that the head F may be adjusted by first releasing the nuts F⁴, then turning the screw I and after proper adjustment is made tightening the nuts F⁴ to rigidly clamp the member F to the bed. The amount of such adjustment is indicated on a gauge J mounted at one side of the bed and having its operating plunger J' attached to the member F.

*Mounting of the mechanism to be tested in the testing machine*

To mount the assembly illustrated in Figs. 2 and 3 in the testing machine, the bearing caps D⁴ and the bearings D⁶ are detached by removing the clamping screws D⁵ and D⁷. This permits of sleeving the bearing D⁶ over the bushing 12 and then inserting the assembly beneath the flange G² and track H so that the bearing D⁶ may again be attached to the member D². The attachment screws D⁷ may be manipulated by a tool or screw driver inserted through apertures G⁴ in the flange G² which by the turning of said flange may be registered with said screws. Before this is done the bushing 11 may be fitted into the half bearing D³ and later the cap D⁴ may be replaced and secured by the screws D⁵. This will place the gear wheel 4 in mesh with the gear wheel E² on the shaft E. The shoe 9 is next engaged with the track H and with the flange H⁴ hooking under a flange at the side of the shoe to retain it in engagement. This may be accomplished by releasing the bolts H² and withdrawing the track H sufficiently for the passage of the flange H⁴ inside the shoe after which the bolts H² are again tightened. The same operations are repeated in the attachment of a second assembly on the diametrically opposite side of the flange D².

*Testing operations*

After mounting the two assemblies in the testing machine as above described and with the gear wheels 4 in mesh with the gear E², motion is imparted to the shaft D by any suitable means (not shown). Assuming that the track H is concentric with the axis of the shafts D and E, the latter shaft will be driven in a one to one ratio to the shaft D. If, however, the track H is adjusted to an eccentric position by the lateral shifting of the member F, then the shaft E will be driven at a higher rotary speed than the shaft D. This is caused by the rocking movement of the shaft 3 which in one direction will be coupled to the corresponding gear wheels 4 through the medium of the one-way clutches 5. However, as all of these gear wheels 4 are in mesh with the gear wheel E², it will be only the gear wheel 4 which is revolving at higher speed than the others that will be coupled by its clutch to its corresponding rock arm. All the other gear wheels 4 will be declutched and freely rotated. A load may be placed on the shaft E corresponding to that which might be placed on the driven shaft of the transmission and I preferably use for this purpose a fan K. This may be mounted on the projecting end of the shaft E and by adjusting the fan blades K' radially, the load may be varied.

*Testing of one-way rotary clutch*

The one-way clutch employed in the mechanism and illustrated in Fig. 3 is preferably formed by a series of sprags 13 which are arranged in an annular space between the shaft 3 and the inner cylindrical face of the gear wheel 4. Each of these sprags is slightly inclined to the radius but has its opposite ends in contact with the parallel cylindrical surfaces on the shaft 3 and gear wheel 4. Consequently, when rotated in one direction, the sprags will wedge and drive the gear wheel with the shaft, while movement in the opposite direction will relieve the wedging pressure to release the clutch. In the operation of the mechanism these clutches are engaged and released in rapid succession. For instance, assuming that the shaft D is rotating at a speed of 2500 R. P. M. and that there are six clutches for each subassembly, then the clutch will remain in engagement for only one two-hundred and fiftieth of a second. It is, therefore, obvious that the clutching and declutching must be substantially instantaneous in order to produce any useful function in such mechanism. Furthermore, the full load must be transmitted through each clutch during its period of engagement. The tests may be performed in different positions of eccentricity of the track H and also at different driving speeds applied to the shaft D and different loads applied to the shaft E. Also, the relative speeds of the shafts D and E during each test may be taken by the instrument usually employed for this purpose. As a result, the test engineer can determine whether or not the clutches are properly functioning. Also, after continuously running the testing mechanism for a certain period of time and then demounting and examining the elements of the clutch, it will be determined whether the various parts are able to stand the stresses to which they are subjected.

Testing of shoes

The shoes 9 have a movement relative to the track H during each cycle. Although this movement is minimized by the rotation of the track with the member G, nevertheless, there is a differential movement of the shoes with respect to the track which may occasionally wear. The shoes are also pivotally mounted on the rock arm which latter as shown are bifurcated with a wrist pin 14 extending across the space therebetween and a roller bearing 15 between this pin and a race member 16 in the shoe. Examining these parts after the test thereof will determine whether they are suitable for use in the transmission.

Testing of track

The track H is not the actual track which is used in the transmission assembly but it is similar in construction and an examination of it after a test thereof will determine how the actual track would perform.

Testing of bearing

The bushing or bearing sleeves 11 and 12 which are placed respectively in the bearings $D^3$ and $D^6$ are examined after the test therein and their ability to successfully perform in the actual structure is determined. While I have described the testing of one specific subassembly of a transmission mechanism, it is obvious that the testing machine might be used for the testing of other assemblies of a more or less similar construction.

Modified construction

With the specific construction of testing machine illustrated in the drawings, only two subassemblies can be tested at one time. However, in the actual variable speed transmission in which these assemblies are used, there are generally more than two as, for instance, six. Consequently, each subassembly is in action for only one-sixth of the cycle whereas in the testing unit it will be in action for one-half of the cycle with a correspondingly greater fluctuation in output speed during its operation. To obtain a closer correspondence between the conditions in the testing machine and those present in actual operation of the transmission, I have devised a modified construction illustrated in Fig. 8. In this construction a counter shaft L is connected to the shaft D through the medium of gears M, M' in a one to one ratio. The same counter shaft is connected through a step-up gearing N, N' to the driven shaft O which latter is an extension of the shaft E in the construction previously described. A one-way clutch $N^2$ is interposed between the shaft O and the gear wheel N' so that while the minimum speed of the shaft O is that determined by the gearing N, N', said shaft can be driven at a greater speed through the medium of the rock shafts, planetary pinions and sun gear of the construction first described. Also, the member F instead of being transversely adjustable is permanently positioned at maximum eccentricity with respect to the axis of the shafts D and E thereby holding the track H in a corresponding eccentric position. Otherwise, the construction is the same as that previously described and need not be referred to more in detail.

In operation of this modified construction, the minimum speed permitted to the driven shaft O is that which would occur with six planetary gears instead of two. Consequently, the testing of each of the two subassemblies will be only through that portion of the cycle in which they would be active if associated with four other subassemblies or six in all. This corresponds to the actual condition in the transmission for which the subassemblies are to be used.

What I claim as my invention is:

1. A machine for testing intermittent driving assemblies constituting portions of variable speed transmissions each of said assemblies including a rockable member, a gear wheel and a one-way clutch therebetween; said testing machine comprising a drive shaft, a coaxial driven shaft, a gear wheel on said driven shaft, means for detachably mounting on said drive shaft a plurality of said assemblies with the gear wheels thereof in mesh with the gear wheel on said driven shaft, and means for oscillating said rockable members out of phase with each other during each cycle of said drive shaft whereby the gear wheels of said assemblies will be intermittently clutched and declutched to transmit accelerated motion to said driven shaft.

2. A machine for testing intermittent driving assemblies constituting portions of variable speed transmissions each of said assemblies including a rockable member, an eccentric bearing thereon, a gear wheel and a one-way clutch therebetween; said testing machine comprising a drive shaft, a coaxial driven shaft, a gear wheel on said driven shaft, means for detachably mounting on said drive shaft a plurality of said assemblies with the gear wheels thereof in mesh with the gear wheel of said driven shaft, an annular track surrounding said shafts and engageable with the eccentric bearing on the rockable member of each of said assemblies, and means for adjusting said annular track from a position concentric with said shafts to positions of variable eccentricity whereby during each cycle of said drive shaft out of phase oscillations will be imparted to said rockable members which are out of phase with each other intermittently clutching and declutching the respective gear wheels thereof and communicating from the clutched gear wheels accelerated motion to said driven shaft in proportion to the eccentricity of said track.

3. A machine for testing intermittent driving assemblies constituting portions of variable speed transmissions, each of said assemblies including a rockable member, a gear wheel, a one-way clutch therebetween and a shoe eccentrically pivotally connected to the rockable member; said testing machine comprising a drive shaft, a coaxial driven shaft, a gear wheel on said driven shaft, means for variably loading said driven shaft, means for detachably mounting on said drive shaft a plurality of said assemblies with the gear wheels thereof in mesh with the gear wheel of said driven shaft, an annular track surrounding said shafts engageable with the shoes of said assemblies, means for adjusting said track from a position concentric with said shafts to positions of variable eccentricity whereby in each cycle of said drive shaft oscillations will be imparted to said rockable members out of phase with each other communicating one phase of movement to the associated gear wheel through the intermediate one-way clutch and communicating accelerated motion to said driven shaft against the resistance of the load thereon and in proportion to the eccentricity of said track.

4. A machine for testing intermittent driving assemblies of the type described including a rockable member, a gear wheel, a one-way clutch therebetween and a shoe eccentrically pivotally connected to said rockable member; said testing machine comprising a drive shaft, a coaxial driven shaft, a gear wheel on said driven shaft, means for variably loading said driven shaft, means for detachably mounting on said drive shaft a plurality of said assemblies with the gear wheels thereof in mesh with the gear wheel of said driven shaft, an annular track surrounding said shafts and engageable with said shoes, a bearing on which said track is freely revoluble, and means for adjusting said bearing from a position where said track is concentric with said shafts to positions of variable eccentricity whereby said rockable members will be oscillated by said shoes out of phase with each other, the gear wheels of said assemblies will be intermittently clutched and declutched from their respective gear wheels in rapid succession and will communicate accelerated motion to said driven shaft against the resistance of the load thereon.

5. A machine for testing intermittent driving assemblies of the character described including a rock shaft, a rock arm therefor, a shoe pivotally mounted on said rock arm, a gear wheel surrounding said shaft, a one-way clutch intermediate said shaft and gear wheel and bearings for the opposite ends of said shaft; said testing machine comprising a drive shaft, a coaxial driven shaft, a gear wheel on said driven shaft, means for variably loading said driven shaft, pairs of axially spaced supports detachably connected to said drive shaft for receiving a plurality of assemblies to be tested and engageable with the bearings thereof, the gear wheels of said assemblies being in mesh with the gear wheel on said driven shaft, an annular track surrounding said shafts and engageable with the shoes of said assemblies, a bearing in which said track is freely revoluble, and means for adjusting said bearing from a position where said track is concentric with said shafts to positions of variable eccentricity whereby the rotation of said drive shaft will in each cycle impart oscillations to said rock shafts to intermittently clutch and declutch the corresponding gear wheels and communicate accelerated motion to said driven shaft against the resistance of the load thereon thereby simultaneously testing said shoes, clutches and bearings of each assembly.

6. A machine for testing intermittent driving assemblies constituting portions of variable speed transmissions each of said assemblies including a rockable member, a gear wheel and a one-way clutch therebetween; said testing machine comprising a drive shaft, a coaxial driven shaft, a gear wheel on said driven shaft, means for detachably mounting on said drive shaft a plurality of said assemblies less than the number used in the actual transmission and with the gear wheels thereof in mesh with the gear wheel on said driven shaft, means for oscillating said rockable members out of phase with each other during each cycle of said drive shaft whereby the gear wheels of said assemblies will be intermittently clutched and declutched to transmit accelerated motion to said driven shaft, and a separate driving connection between the drive shaft and driven shaft for imparting a predetermined minimum speed to the latter whereby the test will correspond to only that portion of the cycle of each assembly which is used in the actual transmission.

JOHAN LUND.